United States Patent [19]

Garner

[11] 4,339,248

[45] Jul. 13, 1982

[54] PROCESS FOR THE PURIFICATION OF GASEOUS EFFLUENT FROM INDUSTRIAL PROCESSES

[75] Inventor: James W. Garner, Farmington Hills, Mich.

[73] Assignee: Grow Group, Inc., New York, N.Y.

[21] Appl. No.: 95,337

[22] Filed: Nov. 19, 1979

Related U.S. Application Data

[63] Continuation of Ser. No. 739,203, Nov. 8, 1976, abandoned.

[51] Int. Cl.$^3$ .............................................. B01D 47/00
[52] U.S. Cl. ........................................ 55/89; 427/401; 98/115 SB; 55/84
[58] Field of Search ................. 98/115 SB; 55/84, 85, 55/89; 118/326, DIG. 7, 61; 427/353, 365, 401, 421

[56] References Cited

U.S. PATENT DOCUMENTS

| | | |
|---|---|---|
| 1,138,081 | 5/1915 | Carrier . |
| 1,749,920 | 3/1930 | Modave . |
| 1,966,280 | 7/1934 | Bingman . |
| 2,066,913 | 1/1937 | Schmieg . |
| 2,086,514 | 7/1937 | Saunders . |
| 2,188,439 | 1/1940 | Kirkpatrick . |
| 2,232,561 | 2/1941 | Richards . |
| 2,289,537 | 7/1942 | Bright . |
| 2,372,085 | 3/1945 | Jones et al. ............................ 55/89 |
| 2,395,960 | 3/1946 | Clark et al. |
| 2,407,255 | 9/1946 | Cupery . |
| 2,575,276 | 8/1948 | Jacoby et al. |
| 2,593,548 | 4/1952 | Edwards . |
| 2,604,185 | 7/1952 | Johnstone et al. |
| 2,618,133 | 11/1952 | Kennedy . |
| 2,668,150 | 3/1954 | Luvisi . |
| 2,694,466 | 11/1954 | Bingman . |
| 2,928,498 | 3/1960 | Schmid-Nisoli et al. |
| 3,170,384 | 2/1965 | Krantz et al. |
| 3,173,879 | 3/1965 | Arnold et al. |
| 3,353,800 | 11/1967 | Jens . |
| 3,429,823 | 2/1969 | Catanco . |
| 3,440,803 | 4/1969 | Wechselblatt . |
| 3,475,202 | 10/1969 | Bok . |
| 3,551,189 | 12/1970 | Gray et al. |
| 3,599,399 | 8/1971 | Gallen . |
| 3,633,340 | 1/1972 | Illingworth . |
| 3,635,827 | 1/1972 | Jakobi . |
| 3,667,191 | 6/1972 | Prince . |
| 3,671,465 | 6/1972 | Murphy . |
| 3,750,622 | 8/1973 | Repp et al. . |
| 3,807,291 | 4/1974 | Roberts et al. ................. 98/115 SB |
| 3,861,887 | 1/1975 | Forney . |
| 3,867,112 | 2/1975 | Honerkamp . |
| 3,873,363 | 3/1975 | Bakka et al. |
| 3,876,399 | 4/1975 | Saponaro . |
| 3,880,620 | 4/1975 | Lange et al. |
| 3,884,654 | 5/1975 | de Crevoisier et al. |
| 3,888,641 | 6/1975 | Ito . |
| 3,914,115 | 10/1975 | Parker . |
| 3,926,592 | 12/1975 | Leva . |
| 3,932,151 | 1/1976 | Lau . |
| 3,965,805 | 6/1976 | Muehlbauer . |
| 3,967,942 | 7/1976 | Pain et al. |
| 3,985,692 | 10/1976 | Sykes et al. |
| 3,985,922 | 10/1976 | Thornton et al. |
| 4,002,490 | 1/1977 | Michalski et al. ..................... 55/84 |
| 4,005,997 | 2/1977 | Fowler et al. |
| 4,054,429 | 10/1977 | Ostojic et al. |
| 4,067,806 | 1/1978 | Mauceri . |
| 4,102,303 | 7/1978 | Cordier et al. ......................... 55/85 |
| 4,102,983 | 7/1978 | Yamese et al. ......................... 55/84 |

FOREIGN PATENT DOCUMENTS

| | | |
|---|---|---|
| 207554 | 7/1907 | Fed. Rep. of Germany . |
| 726287 | 10/1942 | Fed. Rep. of Germany .......... 55/84 |
| 2451157 | 4/1976 | Fed. Rep. of Germany . |
| 2511181 | 9/1976 | Fed. Rep. of Germany .......... 55/84 |
| 2289593 | 5/1976 | France . |
| 51-9066 | 1/1976 | Japan ..................................... 55/89 |
| 51-10610 | 4/1976 | Japan . |
| 8600 | 12/1922 | Netherlands . |
| 14622 | 11/1925 | Netherlands . |
| 15448 | 5/1926 | Netherlands . |
| 129024 | 7/1919 | United Kingdom . |
| 262404 | 2/1927 | United Kingdom . |
| 498956 | 4/1976 | U.S.S.R. ................................ 55/84 |
| 391842 | 10/1977 | U.S.S.R. |

OTHER PUBLICATIONS

Chemical Engineers Handbook, 4th Ed., pp. 18–33, John H. Perry, Editor.

Technical Bulletin of Union Carbide Regarding UCON Lubricants.

Gatrell, Roger L., "A Mixed-Substrate Column for Gas Chromatographic Analysis of Paint Thinners and Related Solvent Mixtures".
Encyclopedia of Chemical Technology, Kirk-Othmer, 2nd Ed., vol. 1, pp. 44-59, 171, 175-176 and 622.

*Primary Examiner*—Bernard Nozick
*Attorney, Agent, or Firm*—Burton, Parker & Schramm

[57] ABSTRACT

Described is a process for the purification of gaseous effluent of industrial processes by providing a gas containing at least a hydrocarbon solvent and/or an oxygenated solvent and passing said gas into a gas absorbing means comprised of a nonreactive liquid solvent for said gas, said liquid solvent being liquid and substantially nonvolatile at ambient temperatures and pressures. Preferably, the liquid absorbing solvent is reclaimed by separating the gaseous effluent therefrom. The gaseous effluent is preferably that resulting from the application of paint.

16 Claims, 2 Drawing Figures

PROCESS FOR THE PURIFICATION OF GASEOUS EFFLUENT FROM INDUSTRIAL PROCESSES

This is a continuation of application Ser. No. 739,203, filed Nov. 8, 1976 now abandoned.

BACKGROUND OF THE INVENTION

The present application is concerned with the area of gaseous effluent pollution control. More particularly, the invention is concerned with the gaseous effluent resulting from industrial processes, in particular, the application and drying of paint on substrates such as transportation vehicles as automobiles, trucks, and the like.

During various industrial processes, gaseous effluent is formed. Due to the increased concern with the atmospheric environment, various processes have been suggested to control the gaseous effluent introduced into the environment. Increased research and development has been undertaken, especially with respect to the effluent resulting from the application of liquid paints containing organic solvents to various substrates such as automobiles, trucks and the like. One such process is that described in U.S. Pat. No. 3,932,151, which relates to paint spray booth construction and control of excess atomized paint from the air in the vicinity of a spray-painting operation.

Another proposed solution to the problem of gaseous effluent control is a technique where the gaseous effluent is adsorbed onto a high surface area of carbonaceous substance, such as activated carbon. The difficulty with such a procedure is that when it came time to remove the adsorbed solvent, a vacuum stripping operation was employed, which therefore produced a hazardous condition in that the solvent was explosive at such vapor concentrations. To overcome this problem, water was applied to the activated carbon, thereby significantly decreasing the effectiveness of the activated carbon by substantially decreasing the surface area of the activated carbon. Such an approach is highly inefficient for large volumes of gaseous effluent.

In designing a process for the purification of gaseous effluent one must be particularly conscious of being able to re-claim the gaseous effluent in order to make the process economically desirable from an overall point of view.

SUMMARY OF THE INVENTION

The invention is concerned with a process for the purification of gaseous effluent from industrial processes comprising the steps:

1. Providing a gas containing at least a hydrocarbon substance and/or an oxygenated organic substance;
2. Passing said gas into a gas absorbing means comprised of a nonreactive liquid solvent for said gas, said liquid solvent being liquid and substantially non-volatile at ambient temperatures and pressures. Preferably, the liquid absorbing solvent is re-claimed by separating said gaseous effluent therefrom.

DESCRIPTION OF PREFERRED EMBODIMENTS

Figure 1:
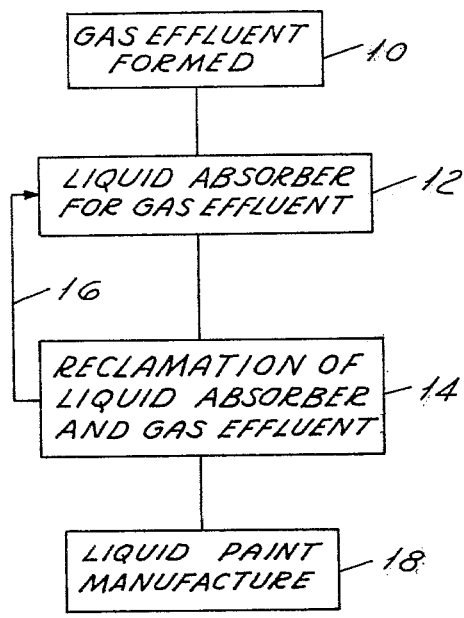
FIG. 1 is a schematic diagram of the process of the present invention including the use of the solvent by-products.

Industrial processes that the present application is directed towards are any processes where gaseous effluent is formed, which effluent is deleterious to the environment. In particular, the most preferred process is the gaseous effluent formed from the application of liquid paint.

Liquid paint is used in its broadest terms to include materials that contain organic film-formers dissolved in organic solvents, with or without pigments, coating compositions regardless of how formulated, whether a latex or an emulsion, a slurry, a suspension and the like providing the gaseous effluent resulting therefrom contains hydrocarbon and/or oxygenated paint solvents. The gaseous effluent formed from the application of paint not only includes the application of the paint itself but the volatilization of the solvent from the liquid paint during the drying of the liquid paint. By "gas" is meant to include not only a gas phase effluent but also an atomized paint overspray formed during the application of the paint to a substrate.

The most preferred gaseous effluent is one that contains solvents for liquid paint which solvents are a mixture of substances. In particular, a hydrocarbon substance and an oxygenated substance.

Liquid paints are normally comprised of a resin film-former (natural or synthetic), pigments and a liquid solvent. Suitable liquid paint solvents are aliphatic alcohols from 1 to 8 carbon atoms such as methanol, ethanol, isopropanol, n-butanol, octanol, and the like; aliphatic ketones such as acetone, methylethyl ketone, methylisobutyl ketone, diisobutyl ketone cyclohexanone and the like; esters such as short chain aliphatic acids reacted with short chain aliphatic alcohols where the total number of carbon atoms of the acid and the alcohol is approximately 12, such as ethylacetate, butyl acetate, and the like; hydrocarbon solvents such as those containing up to 12 carbon atoms, as hexane, octane, cyclohexane, xylene, toluene, benzene and the like; aliphatic ethers and the like such as Cellosolve (trademark of Union Curbide for ethylene glycol monoethyl ether), Cellosolve acetate, butyl Cellosolve, and butyl Cellosolve acetate and the like.

By "oxygenated" is meant organic solvents such as those for paints that contain oxygen in the molecule of the solvent either as an alcohol, a portion of an acid, an ester, or an ether.

The paints or coating compositions with which the present invention is concerned are those containing film-forming organic and natural resins such as hydrocarbon resins, epoxies (such as the reaction product of bisphenol and epichlorohydrin), acrylics, polyesters, polyurethanes, alkyds, vinyls, polyamides, ureas, melamines, polyimides, silicones, polybenzimidazole and the like.

In the application of liquid paint to a substrate, the paint is atomized, such as airless, by air or electrostatically. The paint overspray from the paint spray booth is collected in a water wash by a water curtain. The paint applied to the substrate is then dried by passing it through a heated chamber wherein the solvent is volatilized. During both the application and the drying of the paint, gaseous effluent is formed.

Prior to passing the gaseous effluent to the atmosphere the effluent is then treated according to the process of the present invention which is to sparge or bubble, or pass the gaseous effluent into a liquid absorbing means, such as a liquid absorber which is a solvent for the gaseous effluent.

The liquid absorber with gaseous effluent therein may be retained in a suitable reservoir or may be subsequently collected and re-claimed as desired. The advantage of using a liquid absorbing means is that it can be readily handled, pumped, stored and reclaimed.

In this manner there need be no variation to the organic paint systems that are currently employed, for one is concerned not with modification of the paint system itself, but rather the absorption of the gaseous effluent and the most efficient, economical reclamation of the liquid absorbing means.

The liquid absorbing means of the present invention is one that is non-reactive with the gaseous effluent. In addition, the liquid absorbing means is one that is liquid and is substantially non-volatile at ambient temperatures and pressures as well as the temperatures and pressures in which the industrial process and the reclamation of the organic solvent is operable.

Suitable liquid absorbing means are those having a vapor pressure of less than 1 mm Hg pressure @ 68° F. (20° C.), most preferably less than 0.01 mm Hg. Examples of said liquid absorbing means are polyoxyalkylene glycol, preferably of the structure $HO\text{--}[R\text{--}O]_m H$ where R contains 2 to 4 carbon atoms and m ranges from 2 to 2000 as polyoxyethylene glycol, polyoxypropylene glycol, polyoxybutylene glycol; saturated aliphatic polyols having from 2 to 12 carbon atoms as glycerol, ethylene glycol; dibasic esters such as the dialkyl (up to 8 carbon atoms per group) esters of saturated aliphatic polycarboxylic acids (up to 10 carbon atoms per acid group), such as dialkyl oxalate, dialkyl malonate, dialkyl succinate, dialkyl glutarate, dialkyl adipate, dialkyl pimelate, dialkyl suberate, dialkyl azelate, dialkyl sebacate and the like; saturated aliphatic ketones such as diacetonealcohol, methyl heptyl ketone; aromatic dicarboxylic acid esters such as dialkyl phthalate of from 4 to 13 carbon atoms per alkyl group as didecyl or dioctyl phthalate and the like; and non-reactive mixtures thereof. The term "polyoxyalkylene" is meant to include compounds prepared by reacting ethylene oxide, propylene oxide and/or butyl oxide together with or without other co-reactants as alcohols, as long as there is at least several $+R\text{--}O+$ repeating linkages. It is to be appreciated that other non-reactive substance may be added as diluents or viscosity control agents to assist the fluidity of the liquid. A preferred liquid absorbing means is a 50—50 mixture by volume of didecyl phthalate and a polyoxyalkylene glycol (Ucon, LB - 65, Trademark of Union Carbide) having a vapor pressure of less than 0.01 mm Hg pressure @ 68° F. (20° C.).

It is preferred that the liquid absorbing means have as low a vapor pressure as possible. This will allow as little of the liquid to be volatilized as possible during the absorption of paint spray effluent.

The overall process of the present invention is described in FIG. 1 wherein the gaseous effluent is formed at 10, which effluent is passed into a liquid absorbing means containing a liquid absorber described herein. The outlet of said liquid absorber permits the absorbed gaseous effluent to be passed to a reclamation zone 14. In the reclamation zone, the liquid absorber is separated from the gaseous effluent. The liquid absorbing means is then recycled by means of line 16 back to the liquid absorber for subsequent utilization therein. The gaseous effluent which is primarily solvent from the liquid paint may then be used and re-processed in the manufacture of liquid paint 18. If the gaseous effluent formed at step 10 is other than paint solvent from the application and drying of paint, the product resulting from reclamation of the liquid absorber would then be disposed.

Figure 2:
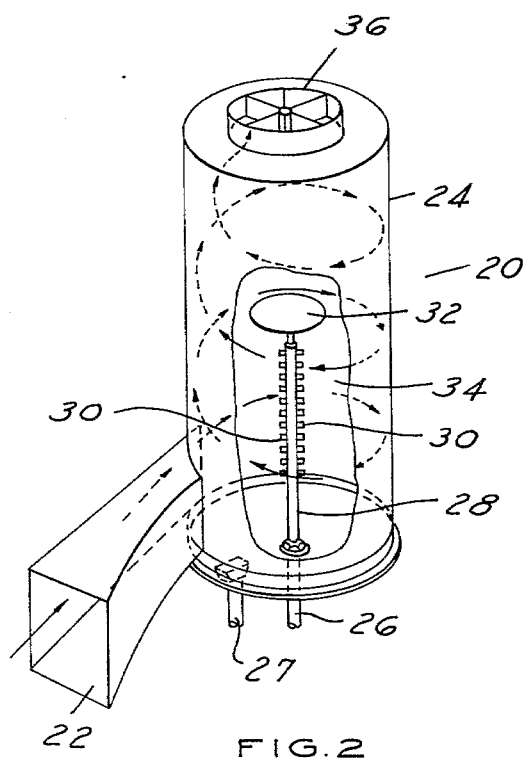
FIG. 2 is a schematic view of a cyclonic spray scrubber which is a liquid absorber for the gaseous effluent.

One type of liquid absorber apparatus that may be used in this invention is described and shown in FIG. 2 which is a schematic diagram of a cyclonic spray scrubber 20 having an air or gaseous inlet 22. The gas passing through inlet 22 is tangentially passed into the cyclonic chamber 24 which has a liquid inlet 26 and a liquid outlet 27. The inlet 26 permits the liquid absorber to be passed through a duct 28 and sprayed through the spray manifold sections 30 comprised of a plurality of nozzles. The top of the spray manifold is a core buster disc 32.

The gas effluent from the industrial process enters through the inlet 22 and circles around the cyclonic chamber coming in direct contact with the sprayed liquid absorber 34, which is a fine division of the liquid absorber permitting a high surface area for the air to come into contact therewith. A very high efficiency is achieved in that substantially all of the gaseous effluent containing undesirable pollutants is absorbed in the liquid phase with the remaining gas exiting through the anti-span vanes 36. The liquid absorber is then collected at the outlet 27 for subsequent processing at the reclamation zone 14. The cyclonic chamber can be manufactured from any metal stable to the gaseous effluent, e.g., stainless steel, glass-lined metal chambers and the like. A series of cyclonic chambers may be used to purify the gaseous effluent in step-wise fashion by passing the effluent from each cyclonic chamber to the next.

Cyclonic spray scrubbers described herein are further described in *Chemical Engineers Handbook*, Fourth Edition, at page 18-33 and following.

The reclamation zone is primarily directed towards a means of separating the liquid absorber from the gaseous effluent which is absorbed therein. Any means may be employed to form the separation. Two principal techniques are preferred. One is a vacuum distillation and the second is the utilization of microfiltration. In the vacuum distillation, it is highly preferred that there be a large differential between the boiling point of the liquid absorber and the gaseous effluent absorbed therein. If the differential is at least 200° F., then a high separation efficiency can be achieved.

A more efficient technique for separating the liquid absorber from the gaseous effluent may be through the utilization of membranes which facilitate a microfiltration approach. In other words, membranes are inserted in a conduit through which the liquid passes. A low molecular weight substance will pass therethrough while a higher molecular weight substance will be prevented from passing therethrough.

Having described the invention in its broad aspect, listed below are operative embodiments. All temperatures are in degrees, Fahrenheit, and all percentages are percentages by weight, unless otherwise indicated.

EXAMPLES

At ambient temperature and pressure, air was bubbled through a bottle containing a typical acrylic paint solvent made up of a mixture of Cellosolve acetate, butyl Cellosolve acetate, acetone, aliphatic alcohols (up to $C_3$) and aliphatic hydrocarbons (up to $C_8$). The first bottle was connected to a second and that to a third bottle with a liquid absorber in each of the second and third bottles to a level of 2". The air with entrained gaseous effluent from the first bottle was passed into bottles 2 and 3 under the surface of the liquid therein. Listed on the following page in Table I is a recital of the various liquid absorbing means used and the percentage of gaseous effluent recovered at each stage.

TABLE I

| Example No. | Liquid Absorber | Percentage Recovery of Gaseous Effluent in Bottle No. 2 | Percentage Recovery of Gaseous Effluent in Bottle No. 3 | Total |
|---|---|---|---|---|
| 1 | Didecyl phthalate | 20.3 | 16.2 | 36.5 |
| 2 | Ucon LB 65* | 45.4 | 19.2 | 64.8 |
| 3 | Ucon LB 135* | 21.3 | 14.7 | 36.0 |
| 4 | Ucon LB 385* | 20.2 | 14.0 | 34.2 |

*Ucon 65 is a trademark of Union Carbide for the water immiscible reaction product of isobutanol and propyleneoxide having a molecular weight ($mw_w$) of 375. Ucon LB 135 and Ucon LB 385 are substantially the same as Ucon LB 65 except their molecular weights are 620 and 1150, respectively.

What is claimed is:

1. A process for the purification of gaseous effluent resulting from the application of liquid paint comprising the steps:
    1. spraying a liquid paint onto a substrate thereby forming a gaseous effluent containing pollutants, said gaseous effluent containing at least a hydrocarbon solvent or an oxygenated solvent; and
    2. in a zone spaced from that in which step 1 is performed, absorbing the pollutants in the gaseous effluent by passing the gaseous effluent into a non-reactive liquid solvent for said gaseous pollutants, wherein said liquid solvent is substantially non-reactive liquid solvent for said gaseous pollutants, wherein said liquid solvent is substantially non-volatile at ambient temperature and pressure, is substantially water immiscible and contains only the elements carbon, hydrogen and oxygen and wherein the liquid absorber is comprised of a polyoxyalkylene glycol.

2. The process of claim 2 further comprising re-claiming said gas absorbing means by separating said gaseous effluent therefrom.

3. The process of claim 1 wherein the gaseous effluent contains entrained atomized droplets of a hydrocarbon solvent and an oxygenated solvent, said solvents being solvents for liquid paint.

4. The process of claim 1 wherein the liquid absorber has a vapor pressure of less than 1 mm Hg pressure @ 68° F. (20° C.).

5. The process of claim 1 wherein the liquid absorber has a vapor pressure af less than 0.01 mm Hg pressure @ 68° F. (20° C.).

6. The process of claim 1 wherein the liquid absorber is a mixture of a polyoxyalkylene glycol and a dialkyl phthalate.

7. The process of claim 1 wherein the passing of the gas into the gas absorbing means is performed by finely dividing the gas absorbing means and contacting the gaseous effluent with the finely divided gas absorbing means.

8. A process for the purification of gaseous effluent resulting from the application of liquid paint comprising the steps:
    1. spraying a liquid paint onto a substrate thereby forming a gaseous effluent containing pollutants, said gaseous effluent containing at least a hydrocarbon solvent or an oxygenated solvent;
    2. prior to passing the gaseous effluent to the atmosphere, in a zone spaced from that in which step 1 is performed, absorbing the pollutants in the gaseous effluent by passing the gaseous effluent into a non-reactive liquid solvent for said gaseous pollutants, wherein said liquid solvent is substantially non-volatile at ambient temperature and pressure, is substantially water immiscible and contains only the elements carbon, hydrogen oxygen; and
    3. thereafter passing the gaseous effluent without the pollutants to the atmosphere, wherein the gaseous effluent pollutants are desorbed from the non-reactive liquid solvent by reclaiming said liquid solvent by separating the abosrbed pollutants therefrom, wherein the pollutant in the gaseous effluent is an oxygenated solvent for the liquid paint and wherein the non-reactive liquid solvent has a vapor pressure of less than 1 mm Hg pressure at 68° F. (20° C.) and is comprised of a polyoxyalkylene glycol.

9. In a process for the purification of gaseous effluent resulting from the application of liquid paint, wherein liquid paint is applied to a substrate, thereby forming a gaseous effluent containing at least a hydrocarbon solvent or an oxygenated solvent and prior to passing effluent to the atmosphere, removing the pollutants from the gaseious effluent, the improvement comprising;
    in a zone spaced from that in which the spraying of the substrate takes place, absorbing the pollutants in the gaseous effluent by passing the gaseous effluent into a non-reactive liquid solvent for said gaseous pollutants, wherein said liquid solvent is substantially water immiscible and contains only the elements carbon, hydrogen and oxygen, wherein the liquid solvent is comprised of a polyoxyalkylene glycol.

10. The process of claim 9 further comprising reclaiming said non-reactive liquid solvent by separating said gaseous effluent therefrom.

11. The process of claim 9 wherein the gaseous effluent contains entrained atomized droplets of a hydrocarbon solvent and an oxygenated solvent, said solvents being solvents for liquid paint.

12. The process of claim 9 wherein the liquid solvent has a vapor pressure of less than 1 mm Hg at 68° F. (20° C.).

13. The process of claim 9 wherein the liquid solvent has a vapor pressure of less than 0.01 mm Hg at 68° F. (20° C.).

14. The process of claim 9 wherein the passing of the gas into the non-reactive liquid solvent is performed by finely dividing the liquid solvent and contacting the gaseous effluent with the finely divided liquid solvent.

15. The process of claim 9 wherein the liquid solvent is comprised of the reaction product of butanol and propylene oxide.

16. In a process for the purification of gaseous effluent resulting from the application of liquid paint, wherein liquid paint is applied to a substrate, thereby forming a gaseous effluent containing pollutants, said gaseous effluent containing at least a hydrocarbon solvent or an oxygenated solvent and prior to passing the effluent to the atmosphere, removing the pollutants from the gaseous effluent, the improvement comprising;

absorbing the pollutants in the gaseous effluent by passing the gaseous effluent into a non-reactive liquid solvent for said gaseous pollutants, wherein said liquid solvent is substantially non-volatile at ambient temperature and pressure, is substantially water immiscible and contains only the elements carbon, hydrogen and oxygen, and is a mixture of a polyoxyalkylene glycol and a dialkyl phthalate.

* * * * *

UNITED STATES PATENT OFFICE
CERTIFICATE OF CORRECTION

Patent No. 4,339,248              Dated July 13, 1982

Inventor(s) JAMES W. GARNER

It is certified that error appears in the above-identified patent and that said Letters Patent are hereby corrected as shown below:

In the sepcifications, column 2, line 43, "Curbide" should read --- Carbide ---.

Column 4, line 26, "anti-span" should read --- anti-spin ---.

In the claims:

Claim 2, Column 5, line 43, "claim 2" should read --- Claim 1 ---.

Signed and Sealed this

First Day of March 1983

[SEAL]

Attest:

GERALD J. MOSSINGHOFF

Attesting Officer     Commissioner of Patents and Trademarks

UNITED STATES PATENT OFFICE
CERTIFICATE OF CORRECTION

Patent No. 4,339,248          Dated  July 13, 1982

Inventor(s) JAMES W. GARNER

It is certified that error appears in the above-identified patent and that said Letters Patent are hereby corrected as shown below:

In the specifications, column 2, lines 43, "Curbide" should read ---Carbide---.

Column 4, line 26, "anti-span" should read ---anti-spin---.

In the claims:

Claim 2, Column 5, line 43, "claim 2" should read ---claim 1---.

Claim 5, column 5, line 54, "af" should read ---of---.

Claim 9, column 6, line 30, "gaseious" should read ---gaseous---.

This certificate supersedes certificate of correction issued March 1, 1983.

Signed and Sealed this

Nineteenth Day of April 1983

[SEAL]

Attest:

GERALD J. MOSSINGHOFF

Attesting Officer          Commissioner of Patents and Trademarks